UNITED STATES PATENT OFFICE.

WILLIAM L. VOELKER, OF ELIZABETH, NEW JERSEY, ASSIGNOR TO THE VOELKER LIGHT COMPANY, OF NEW JERSEY.

MATERIAL FOR HOODS OR MANTLES FOR INCANDESCENT GAS-LIGHTS.

SPECIFICATION forming part of Letters Patent No. 591,438, dated October 12, 1897.

Application filed August 18, 1896. Serial No. 603,147. (No specimens.)

*To all whom it may concern:*

Be it known that I, WILLIAM L. VOELKER, a citizen of the United States, and a resident of the city of Elizabeth, Union county, State of New Jersey, have invented certain new and useful Improvements in Materials for Hoods or Mantles for Incandescent Gas-Lights, of which the following is a specification.

My invention relates to improvements in materials for hoods or mantles of incandescent gas-lights, and especially to the coating of filaments with thorium. The said material is composed of a basic substance which consists of lime and magnesia fused intimately together in equal proportions at very high temperatures, as in the electric arc, substantially in the manner described and claimed in Letters Patent of the United States, No. 568,184, dated September 22, 1896, although in my present application I prefer, as above stated, that the lime and magnesia shall be in equal proportions. Proceeding in that manner I obtain a highly-refractory and incandescible substance from which filaments for the manufacture of hoods or mantles may be formed by fusing the mass, drawing fibers out therefrom, and then spinning several of these fibers into filaments, as described in another of my applications now pending in the United States Patent Office, or the mass may be ground into fine powder and then mixed with a viscous material and the compound then forced through a die to form the filaments. These filaments are preferably covered with a combustible fibrous envelop, as of cotton, to give them toughness, and are then woven or braided or otherwise formed into the desired hood or mantle. When made in the last-mentioned ways, the hood or mantle is baked in a suitable oven (in which the combustible envelop is consumed) until it is sufficiently hard to be handled. It is then coated with a thin covering or deposit of thorium oxid containing traces of cerium oxid. This coat or deposit can be put on best by dipping the hood or mantle in a twenty-five-per-cent. solution of thorium and cerium hydrate, thorium and cerium nitrate, or thorium and cerium chlorid. After dipping, the excess of the solution is allowed to drain off. Then the hood or mantle is dried, and when sufficiently dry is again baked at a very high temperature. If the hood or mantle is made of filaments drawn directly from the fused mass, as first above mentioned, then after the hood or mantle is woven it is dipped in the thorium-cerium solution, as above described, dried, and baked at a very high temperature.

Now, having described my improvements, I claim as my invention—

1. A material for use in making incandescents, consisting of a base composed of the oxids of calcium and magnesium combined substantially in the proportions hereinbefore specified and then fused together at high temperatures, and a deposit of thorium oxid, baked thereon, substantially as described.

2. A hood or mantle for incandescent gas lighting composed of filaments which consist of a base which is composed of the oxids of calcium and magnesium combined substantially in the proportions hereinbefore specified and then fused together at high temperatures, and a deposit of thorium oxid, baked thereon, substantially as described.

3. A material for use in making incandescents, consisting of a base composed of the oxids of calcium and magnesium combined substantially in the proportions hereinbefore specified and then fused together at high temperatures and a deposit of thorium oxid with a trace of cerium oxid baked thereon, substantially as described.

4. A hood or mantle for incandescent gas lighting, composed of filaments which consist of a base which is composed of the oxids of calcium and magnesium combined substantially in the proportions hereinbefore specified and then fused together at high temperatures, and a deposit of oxid of thorium with a trace of cerium baked thereon, substantially as described.

In testimony that I claim the foregoing as my invention I have signed my name, in presence of two witnesses, this 17th day August, 1896.

WILLIAM L. VOELKER.

Witnesses:
FRED B. KING,
CLIFFORD W. PERKINS.